Sept. 1, 1959

H. J. LOVEGROVE 2,901,913

HERMETIC SEALING ARRANGEMENTS FOR
ELECTRICAL MEASURING INSTRUMENTS
Filed March 3, 1955

INVENTOR
HENRY JOSEPH LOVEGROVE
By Rudolph Hueck
ATTORNEY

United States Patent Office 2,901,913
Patented Sept. 1, 1959

2,901,913
HERMETIC SEALING ARRANGEMENTS FOR ELECTRICAL MEASURING INSTRUMENTS

Henry Joseph Lovegrove, Hadley Wood, Barnet, England, assignor, by mesne assignments, to Daystrom, Incorporated, Murray Hill, N.J., a corporation of New Jersey Application March 3, 1955, Serial No. 492,015

Claims priority, application Great Britain March 26, 1954

7 Claims. (Cl. 74—18.1)

This invention relates to hermetically sealed electrical measuring instruments and more particularly, although by no means exclusively, to a hermetically sealed zero adjuster stud for an electrical measuring instrument, e.g. of the moving coil type.

In accordance with one aspect of the invention, a rotatable stud or like member extending through a wall of the meter casing is provided with an internal off-set portion for effecting movement, as the stud is rotated, of the member which is to be adjusted, e.g. the zero adjuster arm of a spring-controlled meter mechanism, said internal closed tubular portion of the stud being enclosed within a sheath of flexible but impervious material whose open end is secured in fixed and hermetically sealed relationship to the aforesaid wall carrying the rotatable stud.

In accordance with another aspect of the invention, the rotatable stud or like member is carried within a bushing made of polytetrafluoroethylene (P.T.F.E.), such bushing being itself force-fitted within a surrounding metal bushing which is soldered or otherwise sealed to the wall of the meter casing. In a preferred form of this embodiment the inner end of the P.T.F.E. bushing is shaped to provide an external returned flange embracing the inner end of the metal bushing and also a part of the outer peripheral wall of such metal bushing.

Figure 1:
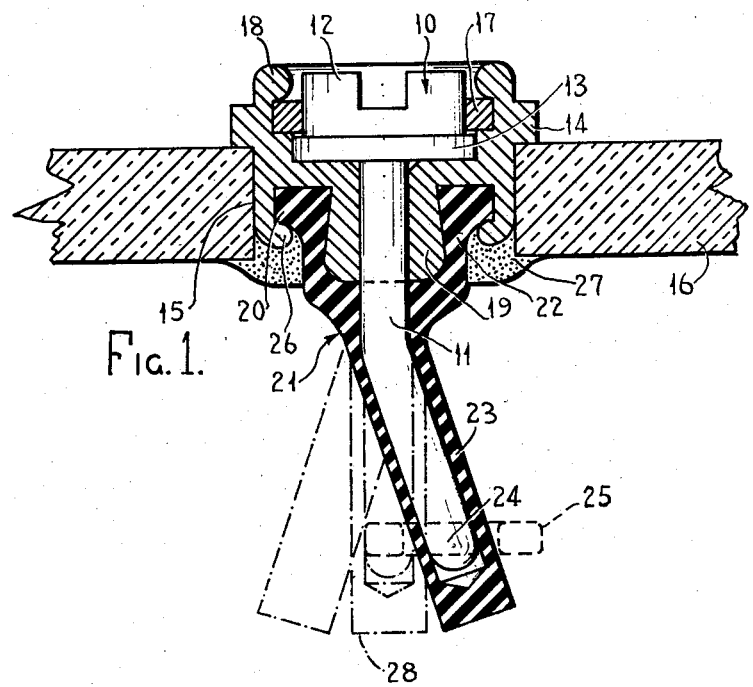
Figure 2:
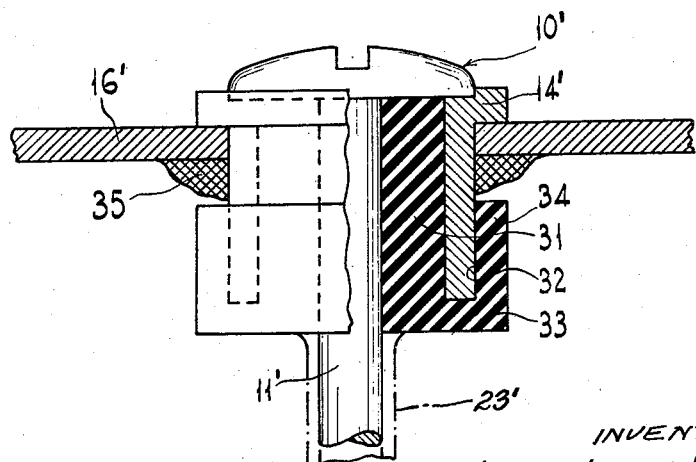

In order that the invention may be more readily understood one embodiment will now be described with reference to the accompanying drawing wherein:

Figure 1 is a central, sectional view showing one embodiment of the invention for effecting adjustment of the movable member of an electrical instrument; and Figure 2 is a similar view, with parts in elevation, of another embodiment of the invention.

The device shown in Fig. 1 comprises a zero adjuster stud 10 having an inwardly projecting pin 11 whose shank is cranked or bent along its length as shown at 24 in a manner to be described below, whereby the inwardly projecting offset end of the pin describes a circular movement and, by engagement in the usual slotted arm 25 of the spring adjuster on a moving coil instrument, can cause alteration of the position of such adjuster to effect change of pointer location. The stud 10 is provided with a slotted head 12 and has an outwardly extending flange 13 which is seated within a recess in a metal bushing 14 secured within a hole 15 in a wall 16 of the meter casing. Such wall may be of glass.

The stud 10 is held in a captive but freely rotatable manner within the bushing 14 by means of a bearing ring 17 located within a counterbore in the bushing and overlying the flange 13. Such bearing ring is secured by turning over the marginal edge of the bushing as shown at 18.

On the inside of the wall 16, the pin 11 extends through an elongated bearing boss 19 on the bushing and into a sheath 21 having an upper cup-like end comprising a flanged margin 20 which extends into a larger diameter sleeve 22 surrounding the boss 19. This sleeve, in turn, leads to a smaller diameter tubular portion 23 having a closed inner end and surrounding the lower, i.e. the inner, part of the pin 11. The sheath is placed over the shank of the pin and then pushed over the boss 19 of the bushing 14. The marginal end 20 of the sheath is thus seated within an inner counterbore or recess in the bushing 14 and is held in fixed and sealed relationship thereto by turning over the marginal edge of such bushing as shown at 26.

The bushing 14, with the attached sheath 21 is secured and sealed within the hole 15 in the plate 16 either by soldering in place, if the plate 16 is of metal or, as shown, by the application of a body of suitable adhesive sealing material 27 such as that known as Araldite, type 1.

In operation, rotation of the stud 10 by means of its external slotted head, produces corresponding rotation of the pin 11 within the surrounding sleeve 23 which flexes as necessary to accommodate the arcuate motion of the offset end 24 of the pin while continuously providing a hermetic seal around such pin.

The zero adjuster stud 10 is preferably made of metal such as brass, preferably nickel plated and care taken to ensure that its outer surface is smooth to prevent abrasion of the sheath 21 within which it turns. The bearing bushing 14 is also of metal preferably brass, tin plated while the bearing ring 17 is preferably made of stainless steel, but may also be of aluminium or Bakelite. The sheath 21 is preferably made of polytetrafluoroethylene, known under the trade names P.T.F.E. or "Fluon." Such material is very hardwearing and can be machined to fine limits. Accordingly the sheath 21 can be turned from solid P.T.F.E. The narrow tubular portion 23 is of sufficiently thin section to give the pliability which allows the bent shank of the pin to be turned about its main axis without fracturing the sheath.

In practice inwardly projecting pin 11 of the zero adjuster stud 10 is preferably made as indicated in chain-dotted lines at 28 without any bent offset region and is inserted into the sheath 21 and the latter secured in position within the bushing 14 while the pin is still in this state. The bending of the pin 11 is effected subsequently, preferably by means which avoid applying any excessive local stress to the material of the sheath.

The alternative form of device shown in Fig. 2 comprises a zero adjuster stud 10' having an inwardly projecting pin 11' which may be bent at its inner end as in the embodiment of Fig. 1 or, alternatively, provided with other means for engaging and moving the adjustable element of the meter mechanism.

Such pin 11' passes through an axial hole in a bushing 31 of polytetrafluoroethylene (P.T.F.E.) which is force-fitted within a metal, e.g. brass, bushing 14' the latter being secured, in sealed manner, to the wall 16' of the meter casing by suitable means such as solder 35 when the wall 16' is of metal.

The bushing 31 extends inwardly beyond the end of the metal bushing 14' and is provided with a cylindrical channel 32 to define an edge covering part 33 and outer returned flange 34 embracing a part of the outer peripheral wall surface of the bushing 14' thereby enhancing the seal and increasing the leakage path between the bushings 14' and 31 by the thickness of the shank of the bushing 14' plus the axial dimension of the flange 34.

The bushing 31 may be provided with an integral tubular sheath 23' surrounding the inner end of the pin 11' as in Fig. 1, if desired. Alternatively such sheath may be omitted.

When the lower end of the pin 11' is not encased in a sheath integral with the bushing 31, the mutually contacting surfaces of the pin and the bushing 31 provide an hermetic seal whilst allowing the stud to be rotated within the bushing. It is possible to provide such an hermetic seal capable of withstanding the high vacuum required in sealed electrical instruments when the bushing 31 is made of P.T.F.E. and if the parts are machined to the necessary limits. For example the bushing 31 may be machined to a tolerance of .002 inch and, when assembled to the stud and the metal bushing 14' it will provide an hermetic seal of the necessary vacuum rating whilst allowing the stud to be rotated.

I claim:

1. A hermetically sealed rotary adjusting device for making adjustments in an instrument mechanism disposed within a casing, said device comprising a metal bushing having a shank passing through a hole formed in a wall of the casing and a flange abutting the exterior surface of the casing wall, means securing the said metal bushing in fixed, sealed relation to the casing wall, a second bushing of resiliently-deformable, electrical insulating material and having a portion only thereof extending into the interior of the casing, means securing the second bushing in fixed, sealed relation to the metal bushing, and a rotatable stud having a head abutting the said metal bushing exterior of the casing and a shank passing into the interior of the casing, the said stud shank and second bushing having mutual bearing contact over an axial length sufficient to provide a hermetical seal therebetween while allowing rotation of the stud for adjustment purposes.

2. The invention as recited in claim 1, wherein the terminal portion of said shank is offset axially and the said second bushing completely encloses the said offset shank portion.

3. The invention as recited in claim 1, wherein the means securing the said second bushing to the metal bushing comprises a circular groove formed in the second bushing, and the shank end of the metal bushing is force-fitted into said groove.

4. The invention as recited in claim 1, wherein the means securing the second bushing to the metal bushing comprises a circular groove formed in the metal bushing, the second bushing includes an integral flange disposed within said groove, and a wall defining said groove is turned inwardly to clamp the flange portion of the second bushing.

5. A hermetically sealed rotary adjustment device for making adjustments in an instrument mechanism disposed within a casing said device comprising a metal bushing having a flange abutting the surface of the casing wall and a shank passing through a hole formed in the wall; means securing the metal bushing in fixed, sealed relation to the casing wall; a circular groove formed in the metal bushing; a stud having a head disposed within an axial bore formed in the metal bushing and a shank passing through an axial hole formed in the metal bushing, said stud shank extending into the casing and having an offset end; and a sheath of resiliently-deformable electrical insulating material encasing the offset shank portion of the stud and including an integral flange disposed within the said groove, the wall defining the said groove being turned inwardly to clamp the said flange.

6. A hermetically sealed rotary adjustment device for making adjustments in an instrument mechanism disposed within a casing, said device comprising a metal bushing having a shank passing through a hole formed in the casing wall and a flange abutting the exterior surface of the wall; means securing the metal bushing in fixed, sealed relation to the casing wall; a second bushing made of a resiliently-deformable electrical insulating material force-fitted into the metal bushing, said second bushing including an integral flange having a circumferential groove therein and the shank end of the metal bushing being force-fitted into said groove thereby increasing the leakage path between the two bushings; and a rotatable adjusting member in the form of a stud having a head abutting the flange of the metal bushing and a shank force-fitted through an axial hole in the second bushing.

7. The invention as recited in claim 6, wherein the end of the stud shank is offset axially and the said second bushing includes an integral sheath completely enclosing the offset stud shank.

References Cited in the file of this patent

UNITED STATES PATENTS

| 423,337 | McManus | Mar. 11, 1890 |
| 1,614,274 | Briegel | Jan. 11, 1927 |
| 1,818,973 | De Giers | Aug. 18, 1931 |
| 2,539,386 | Albert | Jan. 30, 1951 |
| 2,552,686 | Melcher | May 15, 1951 |
| 2,610,410 | L'Abee-Lund | Sept. 16, 1952 |
| 2,615,763 | Wolford | Oct. 28, 1952 |
| 2,784,597 | Miller | Mar. 12, 1957 |